United States Patent
Bristol

[11] Patent Number: 5,131,738
[45] Date of Patent: Jul. 21, 1992

[54] LENS BLANK

[76] Inventor: Alexander C. Bristol, 13217 SW. 142 Ave., Miami, Fla. 33186

[21] Appl. No.: 562,823

[22] Filed: Aug. 6, 1990

Related U.S. Application Data

[63] Continuation-in-part of Ser. No. 354,713, May 22, 1989.

[51] Int. Cl.$^5$ ................................................ G02C 7/02
[52] U.S. Cl. ..................................................... 351/159
[58] Field of Search .................................. 351/159, 167

[56] References Cited

U.S. PATENT DOCUMENTS 3,960,442  6/1976  Davis et al. ...................... 351/159 X
4,289,387  9/1981  Jalie .................................... 351/159

Primary Examiner—Scott J. Sugarman
Attorney, Agent, or Firm—Gifford, Groh, Sprinkle, Patmore and Anderson

[57] ABSTRACT

The present invention provides an aspherical spectacle lens blank for a normal, non-aphakic eyeglass wearer. The lens blank is generally circular in shape and includes a central circular zone which is surrounded by four or more concentric outer zones. For the plus power lens, the outer zones are decreased in diopter refraction from the central zone to the outer peripheral zone. The lens blank of the present invention is lighter and thinner than the previously known spectacle lens blanks.

2 Claims, 1 Drawing Sheet

LENS BLANK

CROSS REFERENCE

This is a continuation-in-part application of Ser. No. 354,713, filed May 22, 1989, entitled ASPHERIC LENS BLANK.

BACKGROUND OF THE INVENTION

I. Field of the Invention

The present invention, which is a continuation-in-part of application Ser. No. 354,713 for an ASPHERIC LENS BLANK relates generally to spectacle lens blanks and, more particularly, to a thin aspheric spectacle lens blank.

II. Description of the Prior Art

The previously known spectacle lens blanks typically comprise a spherical front convex surface and a spherical concave rear surface. The front and rear surfaces of the lens are formed on different radii of curvature thus providing the desired light refraction for the lens. This refraction can vary over the range of positive amounts thus acting to correct farsightedness.

Although previously known positive refraction lens have adequately corrected vision for users, they necessarily result in a relatively thick central portion of the lens. These previously known lenses are not only relatively heavy and therefore uncomfortable to wear, but are also unsightly. Such thick lenses also exhibit chromatic aberration around the outer periphery of the lens for high power lenses, and spherical aberration.

SUMMARY OF THE PRESENT INVENTION

The present invention provides a spectacle lens for a normal, non-aphakic, eyeglass wearer which overcomes all of the above mentioned disadvantages of the previously known lenses.

In brief, the spectacle lens of the present invention comprises a lens having an aspheric front surface. More specifically, the lens of the present invention comprises a central circular zone which is surrounded by several concentric zones. The refraction of the concentric zones decreases for positive refraction lenses.

Since the front surface of the lens is aspheric, the spectacle lens of the present invention is thinner and more lightweight than the previously known spectacle lenses. In particular, the lens of the present invention has a thinner central portion for positive refractive lenses than the previously known lenses.

The lens of the present invention can also include a flat top bifocal segment as well as a round top bifocal segment, or other multifocal types.

In the preferred embodiment of the invention, the lens is formed with CR-39 which has an ABBE value of 59. High index materials may also be utilized.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
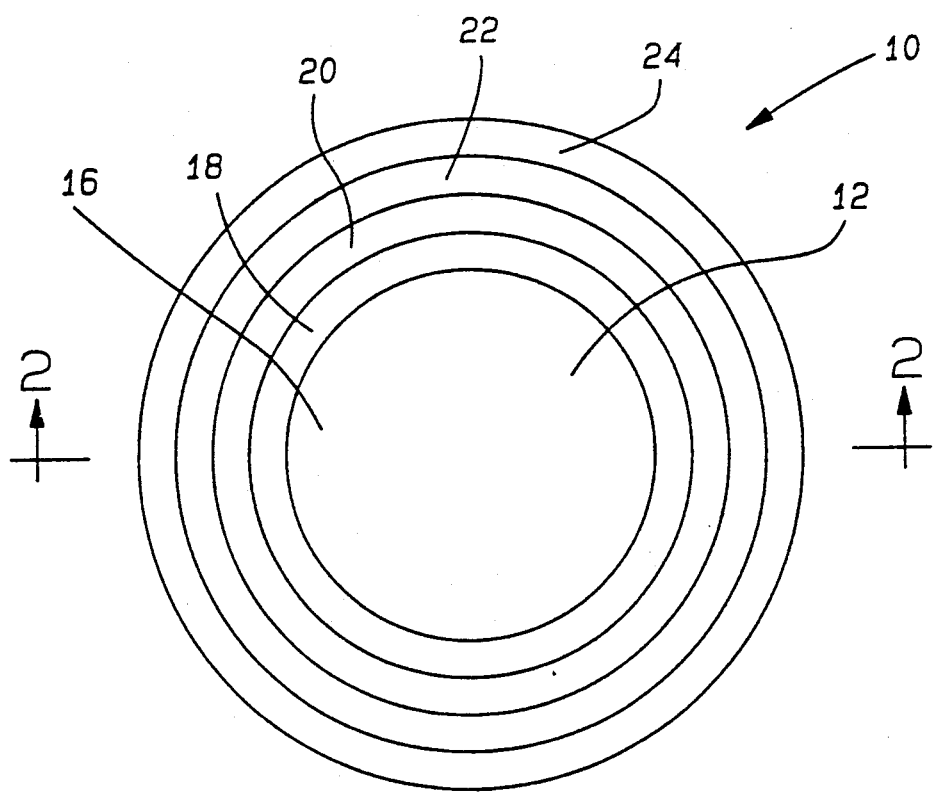
FIG. 1 is a front plan view illustrating a preferred embodiment of the present invention.
Figure 2:
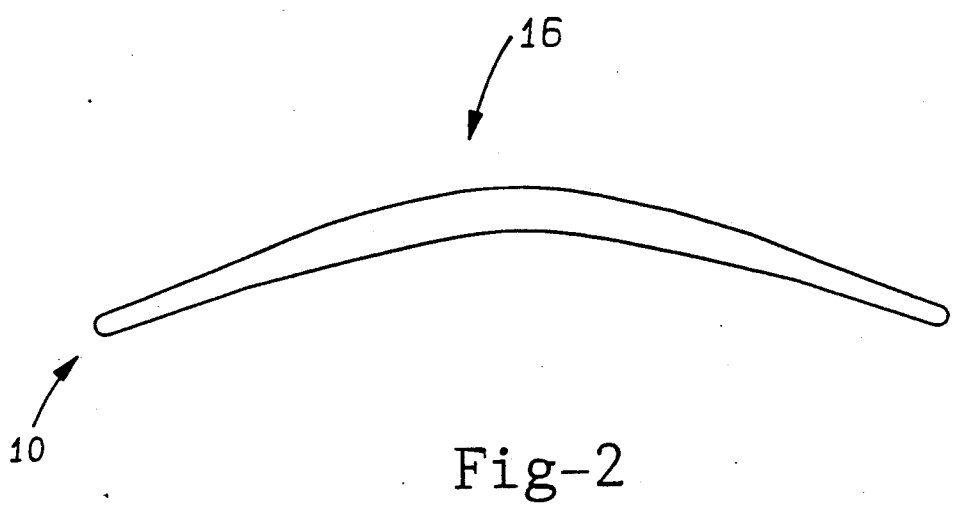
FIG. 2 is a side view along line 2—2 of FIG. 1.

With reference to FIGS. 1 and 2, a preferred embodiment of the lens blank of the present invention is thereshown with a positive refraction for the correction of farsightedness. The lens blank comprises a lens body 10 which, is preferably constructed of CR-39 plastic material. Other transparent materials can, of course, alternatively be used.

The lens body 10 includes a generally convex front surface 12 and a generally concave surface 14. The front surface 12 is not spherical in shape. A central circular zone 16 surrounded by four concentric zones 18, 20, 22, and 24 These zones 16-24 of the lens body 10 are formed in accordance with the following table:

| Zone Number | Diameter (mm) | Zone Power Diopters | Power (Diopters) |
|---|---|---|---|
| 16 | 45 ± 10 | +10.25 | C |
| 18 | 58 ± 7 | +9.50 | C - 0.75 |
| 20 | 67 ± 7 | +8.75 | C - 1.50 |
| 22 | 72 ± 5 | +8.00 | C - 2.25 |
| 24 | 75 ± 03 | +7.00 | C - 3.25 |

Where C equals the lens power in diopters at the optical center 26 of the lens blank 10. The value of C typically ranges between and diopters.

From the foregoing table, it can be seen that the lens body 10 includes zones of diminishing size, the refraction of which decreases from the central zone 16 and to the outer zone 24. The amount of the decrease is set forth in the above table.

By Applicant's use of an aspheric anterior surface for the lens blank of the present invention a much thinner central zone is achieved for plus lenses as contrasted with comparable previously known lens blanks. The net effect, therefore, is to achieve a much more lightweight and aesthetically pleasing lens than the previously known lenses. Additionally, Applicant's lens exhibits less chromatic aberration around the outer periphery for the lenses, and a diminution of spherical aberration.

Although the lens has been described as having a central zone surrounded by four concentric zones, it will be understood that more zones may also be used. As the number of zones increases, however, the amount of diopter change from one zone and to the next decreases. For example, considering the total diopter change from the central zone 16 to an outer zone 18-24 to equal "X", dividing of any single zone 18-24 into two zones, thus doubling the number of zones with ½ X change per zone, would achieve the same end.

Having described my invention, however, many modifications thereto will become apparent to those skilled in the art to which it pertains without deviation from the spirit of the invention as defined by the scope of the appended claims.

I claim:

1. A lens blank comprising:
    a generally circular lens blank for a normal non-aphakic eyeglass wearer having a posterior surface and an aspherical anterior surface with an optical center, said anterior surface having a circular central zone encircled by four concentric zones formed in accordance with the following table:

| Zone Number | Diameter (mm) | Zone Power Diopters | Power (Diopters) |
| --- | --- | --- | --- |
| 16 | 45 ± 10 | +10.25 | C |
| 18 | 58 ± 7 | +9.50 | C - 0.75 |
| 20 | 67 ± 7 | +8.75 | C - 1.50 |
| 22 | 72 ± 5 | +8.00 | C - 2.25 |
| 24 | 75 ± 0 | +7.00 | C - 3.25 |
| | 3 | | | where C equals the lens power at said optical center.

2. A lens blank comprising:

a generally circular lens blank for a normal, non-aphakic eyeglass wearer having a posterior surface and an aspherical anterior surface with an optical center, said anterior surface having a circular central zone encircled by four or more concentric zones formed in accordance with the following table:

| Zone Number | Diameter (mm) | Zone Power Diopters | Power (Diopters) |
| --- | --- | --- | --- |
| 16 | 45 ± 10 | +10.25 | C |
| 18 | 58 ± 7 | +9.50 | C - 0.75 |
| 20 | 67 ± 7 | +8.75 | C - 1.50 |
| 22 | 72 ± 5 | +8.00 | C - 2.25 |
| 24 | 75 ± 0 | +7.00 | C - 3.25 |
| | 3 | | | where C equals the lens power at said optical center, at least one of said concentric zones is further divided into two divided concentric zones, said divided concentric zones exhibiting a one-half change in diopter power as compared to the diopter power of their respective undivided zone.

* * * * *